United States Patent
Ge et al.

(10) Patent No.: US 11,438,011 B2
(45) Date of Patent: *Sep. 6, 2022

(54) SIGNATURE-ENABLED POLAR ENCODER AND DECODER

(71) Applicants: Yiqun Ge, Kanata (CA); Wuxian Shi, Kanata (CA)

(72) Inventors: Yiqun Ge, Kanata (CA); Wuxian Shi, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/882,623

(22) Filed: May 25, 2020

(65) Prior Publication Data

US 2020/0287567 A1    Sep. 10, 2020

Related U.S. Application Data

(63) Continuation of application No. 16/117,863, filed on Aug. 30, 2018, now Pat. No. 10,680,651, which is a
(Continued)

(51) Int. Cl.
*H03M 13/13* (2006.01)
*H04L 1/00* (2006.01)
(Continued)

(52) U.S. Cl.
CPC .......... *H03M 13/13* (2013.01); *H04L 1/0041* (2013.01); *H04L 1/0058* (2013.01); *H04L 1/0061* (2013.01); *H04L 9/3226* (2013.01)

(58) Field of Classification Search
None
See application file for complete search history.

(56) References Cited

U.S. PATENT DOCUMENTS 4,477,903 A     10/1984  Schouhamer Immink
5,353,352 A  *  10/1994  Dent ........................ H04K 1/10
                                                              380/37
(Continued)

FOREIGN PATENT DOCUMENTS

CN      102035626 A      4/2011
CN      102694625 A      9/2012
(Continued)

OTHER PUBLICATIONS

The IEEE 100 the Authoritative Dictionary of IEEE Standards Terms, Seventh Edition, pp. 280, 778, 872, 934, 1210. (Year: 2000).*
(Continued)

*Primary Examiner* — April Y Blair
*Assistant Examiner* — Dipakkumar B Gandhi

(57) ABSTRACT

A transmitter and receiver are provided for communication over a noisy channel in a wireless communications system. The transmitter and receiver use polar coding to provide reliability of data transmission over the noisy wireless channel. In addition, signature bits are inserted in some unreliable bit positions of the polar code. For a given codeword, the receiver with knowledge of the signature can more effectively decode the codeword. Cyclic redundancy check (CRC) bits may also included in the input vector to assist in decoding.

28 Claims, 10 Drawing Sheets

Related U.S. Application Data continuation of application No. 15/364,521, filed on Nov. 30, 2016, now Pat. No. 10,581,462.

(60) Provisional application No. 62/261,590, filed on Dec. 1, 2015.

(51) Int. Cl.
*H04L 9/32* (2006.01)
*H03M 13/53* (2006.01)

(56) References Cited

U.S. PATENT DOCUMENTS

| | | | | |
|---|---|---|---|---|
| 8,347,186 | B1* | 1/2013 | Arikan | H03M 13/1148 714/774 |
| 10,680,651 | B2* | 6/2020 | Ge | H04L 1/0058 |
| 2002/0112210 | A1* | 8/2002 | Kim | H03M 13/13 714/752 |
| 2004/0187071 | A1* | 9/2004 | Zhang | H03M 13/19 714/801 |
| 2011/0305231 | A1 | 12/2011 | Tomlinson et al. | |
| 2011/0310978 | A1 | 12/2011 | Wu et al. | |
| 2012/0189075 | A1 | 7/2012 | Wang et al. | |
| 2013/0111291 | A1 | 5/2013 | Ma | |
| 2013/0117344 | A1 | 9/2013 | Gross | |
| 2013/0283128 | A1 | 10/2013 | Lee et al. | |
| 2014/0019820 | A1* | 1/2014 | Vardy | H03M 13/13 714/752 |
| 2014/0040214 | A1 | 2/2014 | Ma | |
| 2014/0169388 | A1* | 6/2014 | Jeong | H03M 13/1191 370/474 |
| 2014/0169492 | A1* | 6/2014 | Mahdavifar | H03M 13/13 375/267 |
| 2014/0173376 | A1* | 6/2014 | Jeong | H04L 1/0041 714/755 |
| 2014/0208183 | A1 | 7/2014 | Mahdavifar et al. | |
| 2014/0365842 | A1* | 12/2014 | Li | H03M 13/09 714/752 |
| 2015/0077277 | A1 | 3/2015 | Alhussien et al. | |
| 2015/0256196 | A1 | 9/2015 | Alhussien | |
| 2015/0263767 | A1 | 9/2015 | Shin et al. | |
| 2016/0013810 | A1 | 1/2016 | Gross et al. | |
| 2016/0079999 | A1 | 3/2016 | Shen et al. | |
| 2017/0005753 | A1 | 1/2017 | Shen et al. | |
| 2017/0187396 | A1 | 6/2017 | Jeong et al. | |
| 2017/0288703 | A1 | 10/2017 | Shen et al. | |

FOREIGN PATENT DOCUMENTS

| | | |
|---|---|---|
| CN | 103957015 A | 7/2014 |
| CN | 104124979 A | 10/2014 |
| CN | 104219019 A | 12/2014 |
| JP | 2013225307 A | 10/2013 |
| JP | 2018506929 A | 3/2018 |
| KR | 20130001494 A | 1/2013 |
| KR | 20140077492 A | 6/2014 |
| WO | 2015139248 A1 | 9/2015 |

OTHER PUBLICATIONS

Mahdavifar et al., Techniques for polar coding over multiple access channels, IEEE, Conference Paper, pp. 1-6. (Year: 2014).*

E. Arikan "Channel Polarization: A method for constructing capacity-achieving codes for symmetric binary-input memoryless channels", IEEE Transactions on Information Theory, Published Jul. 2009, pp. 1-23, vol. 55, Issue 7.

IEEE 100, "The Authoritative Dictionary of IEEE Standards Terms", 2000, Seventh Edition, IEEE Standards Information Network, IEEE Press, pp. 1, 2, 944, 1123, 1220.

Andersson, Mattias, et al,"Polar Coding for Bidirectional Broadcast Channels with Common and Confidential Messages", XP011524962, IEEE Journal on Selected Areas in Communications (vol. 31, Issue: 9, Sep. 2013), 8 pages.

Tal, Ido et al., "List Decoding of Polar Codes", XP011578805 , IEEE Transactions on Information Theory (vol. 61 , Issue: 5 , May 2015), total 14 pages.

XP011524962 Mattias Andersson et al.,"Polar Coding for Bidirectional Broadcast Channels with Common and Confidential Messages",IEEE Journal on Selected Areas in Communications (vol. 31, Issue: 9 , Sep. 2013),total 8 pages.

XP011578805 Ido Tai et al.,"List Decoding of Polar Codes",IEEE Transactions on Information Theory (vol. 61 , Issue: 5 , May 2015),total 14 pages.

Hof et al., Polar coding for reliable communications over parallel channels, IEEE, Conference Paper, Year: 2010, pp. 1-5.

* cited by examiner $$G_2 = \begin{bmatrix} 1 & 0 \\ 1 & 1 \end{bmatrix} \quad G_2^{\otimes 2} = \begin{bmatrix} G_2 & 0 \\ G_2 & G_2 \end{bmatrix} = \begin{bmatrix} 1 & 0 & 0 & 0 \\ 1 & 1 & 0 & 0 \\ 1 & 0 & 1 & 0 \\ 1 & 1 & 1 & 1 \end{bmatrix} \underset{102}{\longleftarrow}$$

$$G_2^{\otimes 3} = \begin{bmatrix} 0 & 0 & 0 & G_2 \\ 0 & 0 & G_2 & G_2 \\ 0 & G_2 & 0 & G_2 \\ G_2 & G_2 & G_2 & G_2 \end{bmatrix} = \begin{bmatrix} 0 & 0 & 0 & 0 & 0 & 0 & 0 & 1 \\ 0 & 0 & 0 & 0 & 0 & 0 & 1 & 1 \\ 0 & 0 & 0 & 0 & 0 & 1 & 0 & 1 \\ 0 & 0 & 0 & 0 & 1 & 1 & 1 & 1 \\ 0 & 0 & 0 & 1 & 0 & 0 & 0 & 1 \\ 0 & 0 & 1 & 1 & 0 & 0 & 1 & 1 \\ 0 & 1 & 0 & 1 & 0 & 1 & 0 & 1 \\ 1 & 1 & 1 & 1 & 1 & 1 & 1 & 1 \end{bmatrix} \underset{104}{\longleftarrow}$$

FIG. 1
(Prior Art)

SIGNATURE-ENABLED POLAR ENCODER AND DECODER

CROSS REFERENCE

This application is a continuation of U.S. patent application Ser. No. 16/117,863 filed Aug. 30, 2018, which is a continuation of U.S. patent application Ser. No. 15/364,521 filed Nov. 30, 2016, now U.S. Pat. No. 10,581,462, which granted on Mar. 3, 2020, which claims priority to U.S. Provisional Patent Application Ser. No. 62/261,590, filed Dec. 1, 2015, the contents of which are incorporated by reference herein in their entirety.

FIELD

The invention relates to Polar codes, and to encoders and decoders for Polar codes.

BACKGROUND

Polar codes are based on Kronecker product matrices. $G=F^{\otimes m}=F\otimes \ldots \otimes F$ is the m-fold Kronecker product of a seed matrix F.

If A is an m×n matrix and B is a p×x a matrix, then the Kronecker product A⊗B is the mp×nq block matrix:

$$A \otimes B = \begin{bmatrix} a_{11}B & \cdots & a_{1n}B \\ \vdots & \ddots & \vdots \\ a_{m1}B & \cdots & a_{mn}B \end{bmatrix},$$

more explicitly:

$$A \otimes B = \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & \vdots & \ddots & & \vdots & \vdots & \vdots \\ \vdots & \vdots & \vdots & & \ddots & \vdots & \vdots & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}.$$

FIG. 1 shows how a Kronecker product matrix can be produced from a seed matrix $G_2$ 102. Shown in FIG. 1 are the 2-fold Kronecker product matrix $G_2^{\otimes 2}$ 102 and the 3-fold Kronecker product matrix $G_2^{\otimes 3}$ 104, where $$G_2 = \begin{pmatrix} 1 & 1 \\ 0 & 1 \end{pmatrix}.$$

This approach can be extended to produce m-fold Kronecker product matrix $G_2^{\otimes m}$.

A polar code can be formed from a Kronecker product matrix based on matrix $G_2$. For a polar code having codewords of length $N=2^m$, the generator matrix is $G_2^{\otimes m}$. An example of using Kronecker product matrix $G_2^{\otimes 3}$ to produce codewords of length 8 is depicted in FIG. 2. A codeword x is formed by the product of an input vector u and the Kronecker product matrix $G_2^{\otimes 3}$ 104 as indicated at 110. The input vector u is composed of frozen bits and information bits. In the specific example, N=8, so the input vector u is an 8 bit vector, and the codeword x is an 8-bit vector. The input vector has frozen bits in positions 0,1,2 and 4, and has information bits at positions 3,5,6 and 7. An example implementation of a coder that generates codewords is indicated at 112, where the frozen bits are all set to 0, where a circle around a plus symbol indicates modulo 2 addition. For the example of FIG. 2, an N=8 bit input vector is formed from K=4 information bits and N−K=4 frozen bits. Codes of this form are referred to as Polar codes and the encoder is referred to as a Polar encoder.

More generally, in "Channel Polarization: A method for constructing capacity-achieving codes for symmetric binary-input memoryless channels" by E. Arikan, IEEE Transactions on Information Theory Volume 55, Issue 7, Published July 2009, a "channel polarization" theory was proved in chapter IV. Channel polarization is an operation which produces N channels from N independent copies of a binary-input discrete memoryless channel (B-DMC) W such that the new parallel channels are polarized in the sense that their mutual information is either close to 0 (low mutual SNR channels) or close to 1 (high mutual SNRchannels). In other words, some encoder bit positions will experience a channel with high mutual SNR, and will have a relatively low reliability/low possibility to be correctly decoded, and for some encoder bit positions, they will experience a channel with a high mutual SNR, and will have high reliability/high possibility to be correctly decoded. In code construction, information bits are put in the reliable positions and frozen bits (bits known to both encoder and decoder) are put in unreliable positions. In theory, the frozen bits can be set to any value so long as the frozen bit sequence is known to both encoder and decoder. In conventional applications, the frozen bits are all set to "0".

In a communication scenario in which a transmitter may want to send the data only for one or several specific receivers, an encoded block transmitted over the air can be received by any other non-targeted receivers. Various approaches can be employed to prevent these non-targeted receivers from decoding the information. Some systems use a well-known security/encrypting protocol on higher layers to provide privacy. However, these approaches involve some higher-layer scheduling resources, and result in a long processing delay. Moreover, higher-layer scheduling algorithms may not provide sufficient security in a relatively low SNR condition.

It would be advantageous to have a relatively simple approach to providing security for polar codes.

SUMMARY

According to one aspect of the present disclosure, there is provided an apparatus for transmitting information bits, the apparatus comprising: at least one processor configured to produce an input vector for polar encoding, the input vector including information bits and one or more signature bits wherein each bit of the one or more signature bits is placed in a respective bit position of the input vector that has a lower reliability than a reliability of bit positions for the information bits; a polar code encoder that polar encodes the input vector to produce a codeword; and a transmitter that transmits the codeword to at least one receiver device.

Optionally, the apparatus is further configured to: transmit information about the one or more signature bits to the at least one receiver device separately from transmitting the codeword.

Optionally, the one or more signature bit comprises at least one bit that is specific to the at least one receiver device.

Optionally, at least one signature bit of the one or more signature bits is placed in a respective bit position in the input vector that is before bit positions for the information bits.

Optionally, the input vector further comprises frozen bits placed in bits positions with lower reliabilities than reliabilities of bit positions for the information bits.

Optionally, the input vector further comprises cyclic redundancy check (CRC) bits generated based on the information bits, wherein the CRC bits are placed in bit positions with a higher reliability than reliabilities of bit positions for the one or more one signature bits.

Optionally, at least one signature bit of the one or more signature bits is placed in a respective bit position in the input vector that is before bit positions for the information bits and the CRC bits.

Optionally, at least one signature bit of the one or more signature bits is placed in a respective bit position in the input vector that is after a bit position for at least one of the CRC bits.

Optionally, the information bits are placed in bit positions in the input vector that are before bit positions for the CRC bits.

Optionally, the respective bit position for each of the one or more signature bits has a respective bit index that is smaller than bit indices of bit positions for the information bits.

According to another aspect of the present disclosure, there is provided an apparatus for receiving a codeword, the apparatus comprising: a receiver for receiving, from a transmitter device, a codeword produced based on a polar code, the codeword including information bits and one or more signature bits wherein each bit of the one or more signature bits is in a respective bit position that has a lower reliability than a reliability of bit positions for the information bits, and a polar code decoder configured to decode the received codeword to produce decoded bits.

Optionally, the apparatus is further configured to receive, from the transmitter device, information about the one or more signature bits separately from receiving the codeword.

Optionally, the one or more signature bits comprise at least one bit that is specific to a group of receiver devices that includes the receiver device.

Optionally, at least one signature bit of the one or more signature bits is placed in a respective bit position in the input vector that is before bit positions for the information bits.

Optionally, the input vector further comprises cyclic redundancy check (CRC) bits generated based on the information bits, wherein the CRC bits are placed in bit positions with a higher reliability than reliabilities of bit positions for the one or more one signature bits.

Optionally, at least one signature bit of the one or more signature bits is placed in a respective bit position in the input vector that is before bit positions for the information bits and the CRC bits.

Optionally, at least one signature bit of the one or more signature bits is placed in a respective bit position in the input vector that is after a bit position for at least one of the CRC bits.

Optionally, the respective bit position for each of the one or more signature bits has a respective bit index that is smaller than bit indices of bit positions for the information bits.

According to another aspect of the present disclosure, there is provided a method for a transmitter device for transmitting information bits, the method comprising: producing an input vector for polar encoding, the input vector including information bits and one or more signature bits; wherein each bit of the one or more signature bits is placed in a respective bit position of the input vector that has a lower reliability than a reliability of bit positions for the information bits; polar encoding the input vector to produce a codeword; and transmitting the codeword to at least one receiver device.

Optionally, the method further comprises: transmitting information about the one or more signature bits to the at least one receiver device separately from transmitting the codeword.

Optionally, the one or more signature bit comprises at least one bit that is specific to the at least one receiver device.

Optionally, at least one signature bit of the one or more signature bits is placed in a respective bit position in the input vector that is before bit positions for the information bits.

Optionally, the input vector further comprises frozen bits placed in bits positions with lower reliabilities than reliabilities of bit positions for the information bits.

Optionally, the input vector further comprises cyclic redundancy check (CRC) bits generated based on the information bits, wherein the CRC bits are placed in bit positions with a higher reliability than reliabilities of bit positions for the one or more one signature bits.

Optionally, at least one signature bit of the one or more signature bits is placed in a respective bit position in the input vector that is before bit positions for the information bits and the CRC bits.

Optionally, at least one signature bit of the one or more signature bits is placed in a respective bit position in the input vector that is after a bit position for at least one of the CRC bits.

Optionally, the information bits are placed in bit positions in the input vector that are before bit positions for the CRC bits.

Optionally, the respective bit position for each of the one or more signature bits has a respective bit index that is smaller than bit indices of bit positions for the information bits.

According to another aspect of the present disclosure, there is provided a method for a receiver device for receiving a codeword, the method comprising: receiving, from a transmitter device, a codeword produced based on a polar code, the codeword including information bits and one or more signature bits wherein each bit of the one or more signature bits is in a respective bit position that has a lower reliability than a reliability of bit positions for the information bits, and polar decoding the received codeword to produce decoded bits.

Optionally, the method further comprises receiving, from the transmitter device, information about the one or more signature bits separately from receiving the codeword.

Optionally, the one or more signature bits comprise at least one bit that is specific to a group of receiver devices that includes the receiver device.

Optionally, at least one signature bit of the one or more signature bits is placed in a respective bit position in the input vector that is before bit positions for the information bits.

Optionally, the input vector further comprises cyclic redundancy check (CRC) bits generated based on the information bits, wherein the CRC bits are placed in bit positions with a higher reliability than reliabilities of bit positions for the one or more one signature bits.

Optionally, at least one signature bit of the one or more signature bits is placed in a respective bit position in the input vector that is before bit positions for the information bits and the CRC bits.

Optionally, at least one signature bit of the one or more signature bits is placed in a respective bit position in the input vector that is after a bit position for at least one of the CRC bits.

Optionally, the respective bit position for each of the one or more signature bits has a respective bit index that is smaller than bit indices of bit positions for the information bits.

BRIEF DESCRIPTION OF THE DRAWINGS

Embodiments of the invention will now be described with reference to the attached drawings in which:

FIG. 1 is an example of a conventional polar code generator matrix;

DETAILED DESCRIPTION

Figure 2:
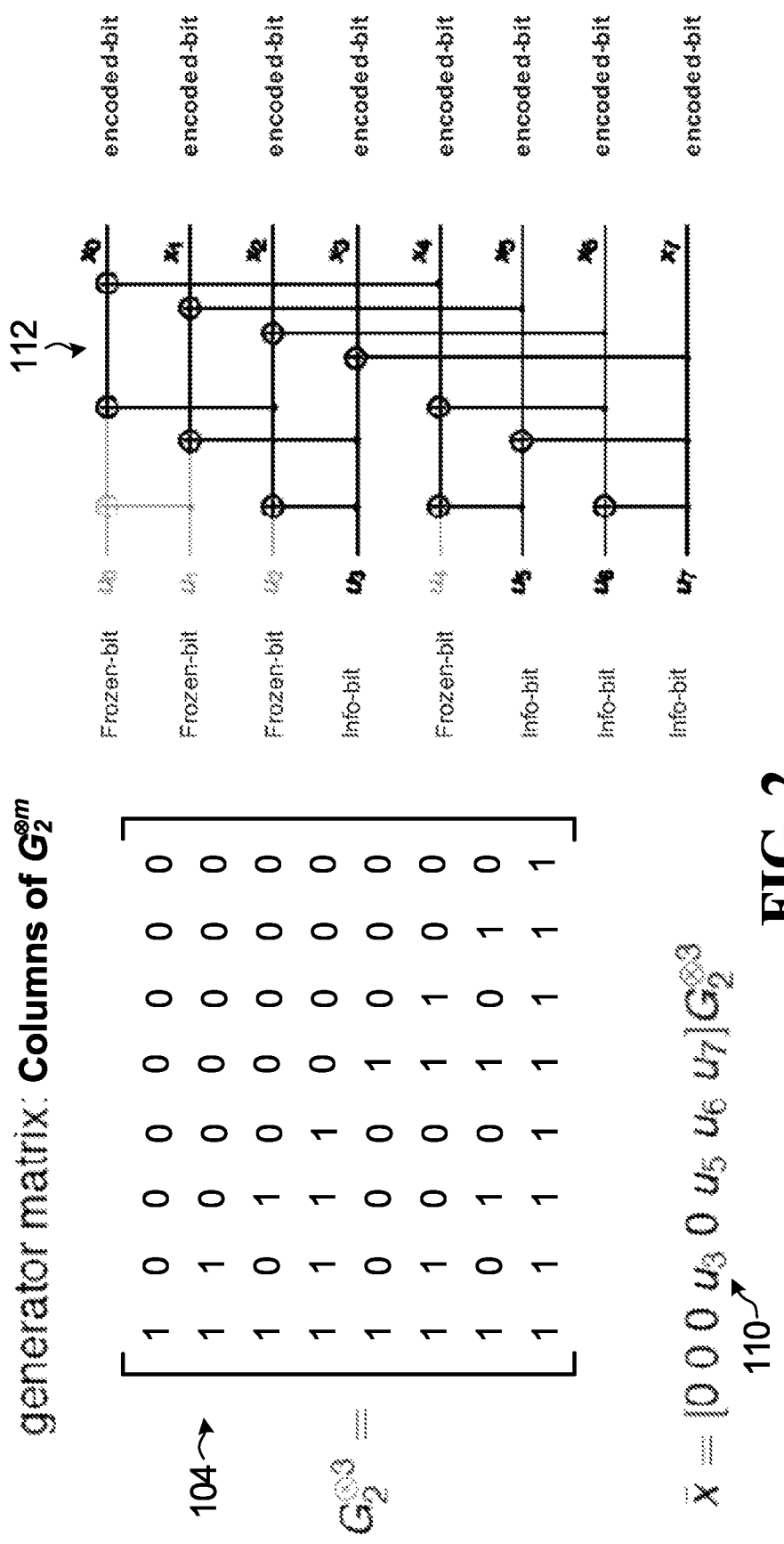
FIG. 2 is an example of a conventional polar code encoder.
Figure 3:
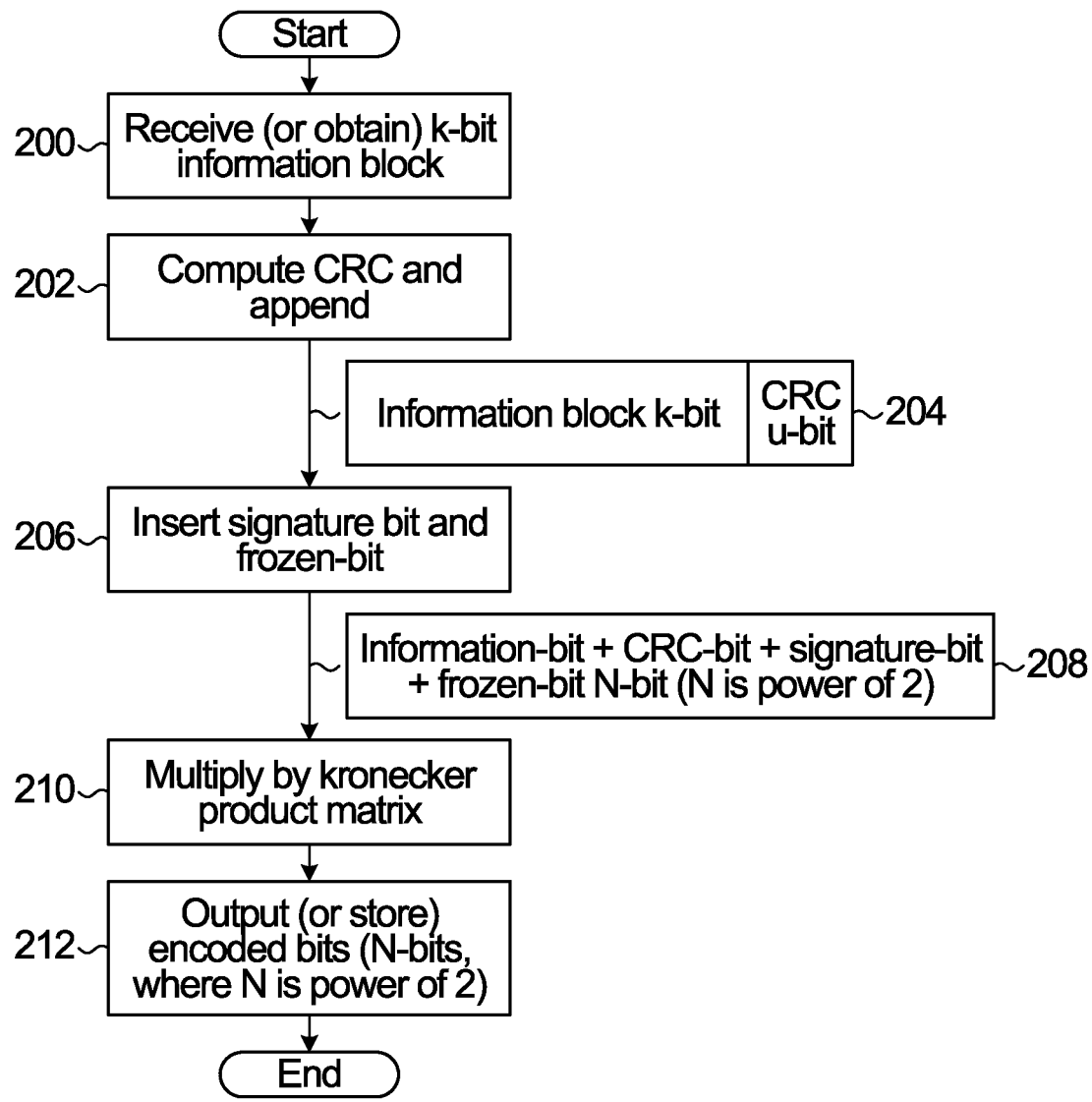
FIG. 3 is a flowchart of a method of CRC-checked signature-enabled polar code encoding according to an embodiment of the invention.

When Polar codes are used, cyclic redundancy check (CRC) bits can be included in the input vector to assist in decoding. CRC bits are generated based on the information bits being transmitted. CRC bits are included in reliable positions (i.e. the positions with a reliable channel). CRC bits may be added to improve polar code performance for short to moderate block length. For a very long block length polar encoder, CRC is not needed. In a case where CRC bits are included, an N-bit input vector is formed from K information bits, a u-bit CRC, and N−K−u frozen bits. An example is depicted in FIG. 3. Starting with a k-bit information block 200, a u-bit CRC is appended at 202 to produce a vector with the K-bit information block, and the u-bit CRC at 204. At 206, the N−K−u frozen bits are inserted to produce the N-bit input vector with the K-bit information block, and the u-bit CRC and the N−K−u frozen bits, where N is a power of 2. The vector 208 is then multiplied by the Kronecker product matrix at 210 to produce an N-bit codeword 212.

Figure 4:
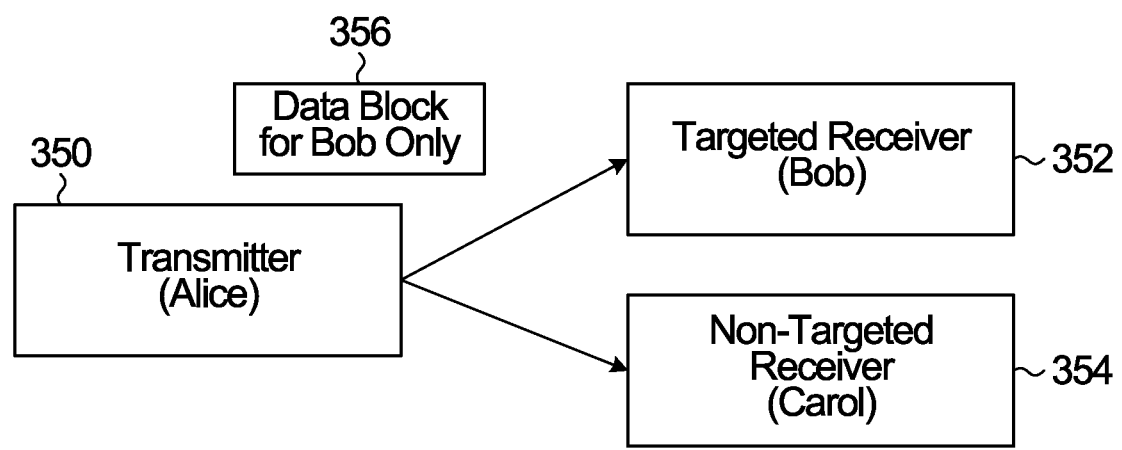
FIG. 4 is a block diagram of an example application scenario for the method of FIG. 3.
Figure 5:
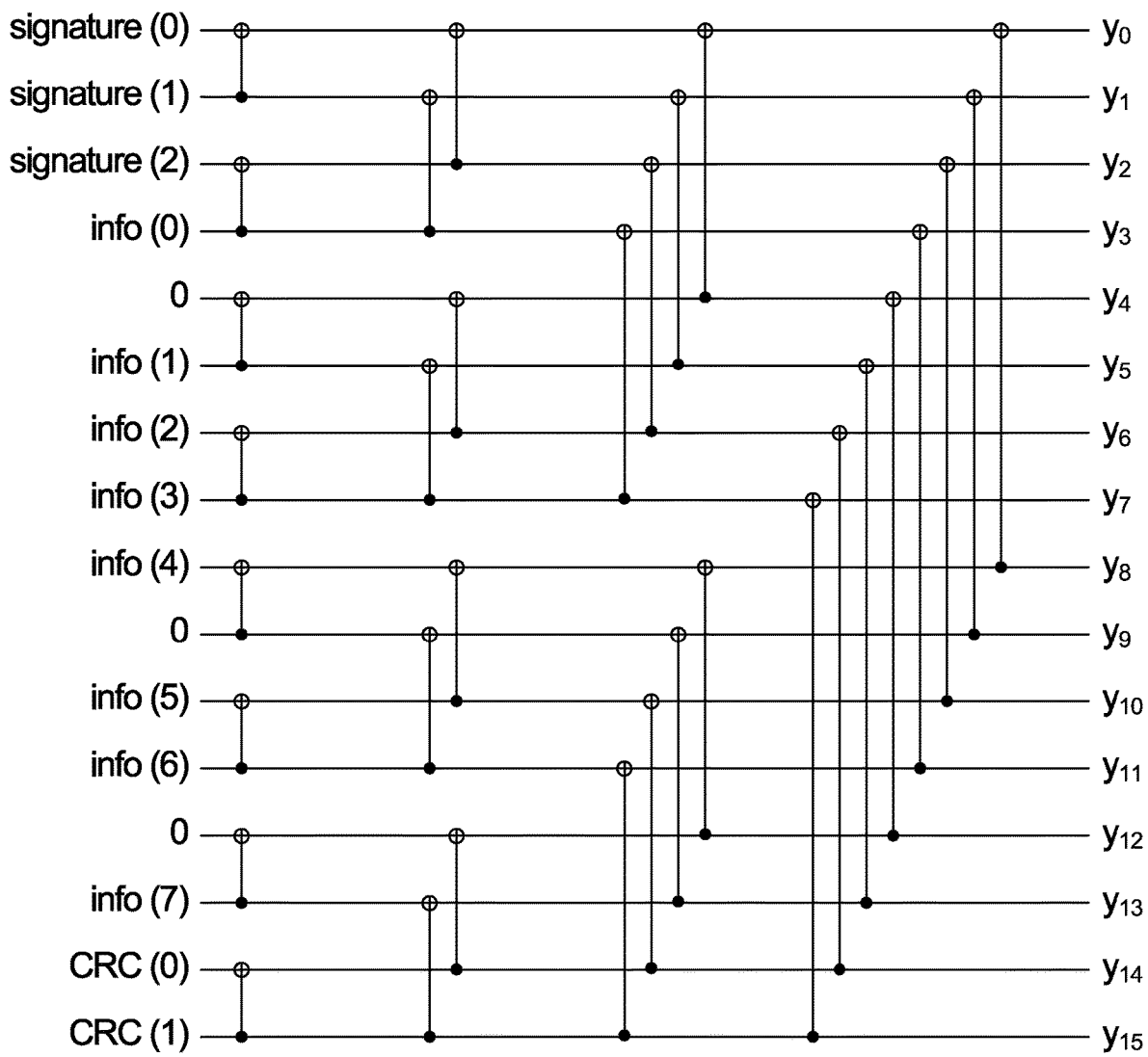
FIG. 5 is an example circuit implementation of the method of FIG. 3.

An example implementation is depicted in FIG. 4, where N=16, K=8, u=2 and there are six frozen bits for a code rate of 0.5 The frozen bits are inserted as positions 0,1,2,4,9 and 12. In the decoder, CRC bits are treated like information bits until such time as they are used to check the other information bits.

A characteristic of a Polar decoder is that once an information bit is decoded, the bit never has the chance to be corrected. A bit that was set at step i cannot be changed at step j>i. In addition, knowledge of the value of future frozen bits or future signature bits is not taken into account i.e. these future bits, even known for the decoder, will not help decode the current information bit.

In a communication scenario in which a transmitter may want to send the data only for one or several specific receivers, an encoded block on the air can be received by any other non-targeted receivers. To prevent these non-targeted receivers from decoding the information, a signature that is known by a transmitter and targeted receiver(s) only is used to protect the encoded data. That is to say, the signature is "embedded" into the encoded data by a given means that only targeted receiver(s) can use it to decode the data. The length of a signature can, for example, be tens of bits up to hundreds of bits. The longer a signature is, the more privacy it can provide, and the larger the resulting signature space. For example with a long enough signature, the signature space may contain thousands or even millions of signatures. In addition, ideally, this signature-enabled feature would be able to work at relatively low signal-to-noise ratio environment.

Some systems use a well-known security/encrypting protocol on higher layers to support the privacy. However, it involves some higher-layer scheduling resources, and results into a long processing delay. Moreover, higher-layer scheduling algorithm may not provide enough anti-jamming function in a relative low SNR condition.

To overcome the shortcomings of methods involving higher-layer scheduling resources, another approach employs signature-based FEC parameters at the physical layer. For example, a Turbo Code's interleaving or puncturing is made a function of the signature. In another example, an LDPC matrix is somehow a function of the signature. These approaches tend to not only have a negative impact on FEC performance but also to increase the complexity of the decoder and the processing latency. Furthermore, their signature space usually contains a very limited number of signatures and can be decoded by brute force.

Another approach involves the use of signature-based Pseudo-scrambling at the physical layer. This approach requires extra resources (computation and buffer) for descrambling and can cause increased processing delay.

In some scenarios, a signature can be the combination of multiple signatures that include a group signature and an individual signature. In this scenario, a part of a data block associated to the group signature can be decoded by all the receivers of the group. A part of a data block associated to the individual signature can be ONLY decoded by this receiver of this group.

Approaches to achieve multiple signatures involve higher layer scheduling, and therefore consume more resources for high-layer scheduling and may result in a long processing time. In addition, this method would divide a long data block into several smaller ones. However, separating a block into several smaller blocks can cause FEC performance (BLER vs. SNR) to degrade due to the smaller blocks (Turbo and LDPC).

An embodiment of the invention provides a single signature-enabled Polar code. In some embodiments, cyclic redundancy check (CRC) bits are included in the input vector to assist in decoding. CRC bits are generated based on the information bits being transmitted. CRC bits are included in reliable positions (i.e. the positions with a reliable channel). CRC bits may be added to improve polar code performance for short to moderate block length. For a very long block length polar encoder, CRC may not be needed. A signature-enabled Polar code with CRC bits is referred to herein as a CRC-checked signature-enabled Polar code. Although an embodiment with CRC is disclosed herein, more generally, in other embodiments, some parity check bits for error detection and/or detection can be included in the relatively reliable bit positions.

Referring to FIG. 3, shown is a flowchart of a method of implementing a CRC-checked signature-enabled Polar code for execution by an encoder. At block 200, a K-bit information block for encoding is received or otherwise obtained. In block 202, a u-bit CRC is computed and inserted to produce a vector with the K-bit information block, and the u-bit CRC at 204. At 206, M signature bits are inserted, and N−K−u−M frozen bits are inserted to produce an N-bit input vector 208 with the K-bit information block, and the u-bit CRC, the M signature bits and the N−K−u−M frozen bits, where N is a power of 2. The vector 208 is then multiplied by the Kronecker product matrix at 210 to produce an N-bit codeword output (or stored) at block 212. The Kronecker product matrix is $G_2^{\otimes m}$, where $N=2^m$.

The information bits and the CRC bits are inserted in to the codeword in positions corresponding to reliable bit positions for the polar code. The CRC bits do not need to all be together or at the end, so long as the transmitter and receiver know the positions of the CRC bits and the information bits. Similarly, the frozen bits and the signature bits are inserted into the unreliable bit positions for the polar code. In some embodiments, all of the frozen bit positions are used for signature bits.

Various signature lengths can be employed. The length of the signature can be tens of bits up to hundreds of bits. The longer a signature is, the more security it can provide. The signature may be long enough such that there are thousands or even millions of unique signatures.

FIG. 4 shows an example scenario where the embodiment of FIG. 3 could be used, where a transmitter 350 (Alice's user equipment (UE)) has data targeted for reception by a targeted receiver 352 (Bob's UE) and does not want non-targeted receiver 354 (Carol's UE) to be able to decode the data. The data block 356 for Bob's UE 352 is transmitted over the air after CRC-checked signature-enabled polar encoding. By only informing the targeted receiver of the signature bits, the non-targeted receiver will not be able to decode the data.

An example implementation is depicted in FIG. 7, where N=16, K=8, u=2, and M=3, and there are three frozen bits for a code rate of 0.5. The signature bits are inserted at bit positions 0,1 and 2. The frozen bits are inserted at positions 4,9 and 12, the information bits are in positions 3,5,6,7,8, 10,11,13, and the CRC bits are at positions 14 and 15.

A CRC-checked signature-enabled Polar decoder does not require significant extra complexity compared with a conventional Polar decoder. The decoder uses the signature bits to decode the information bits in the same ways as frozen bits are used in conventional Polar decoders. Without knowledge of these signature bits, it is nearly impossible for the decoder to decode the information bits successfully. There is no BER/BLER performance degradation due to the presence of the signature bits, as verified by both theory and simulation. In addition, there may be strong anti-jamming and error correction capacity.

In a situation where a data block has a large number of bits (e.g. on the order of a thousand bits) with R=½~⅓, there is room to insert hundreds or even thousands of signature bits, resulting in strong privacy and obstruction capacity.

FIG. 8A shows successive-cancellation decoding for an all-frozen bit Polar code (i.e. one with frozen bits but no signature bits).

Figure 6:
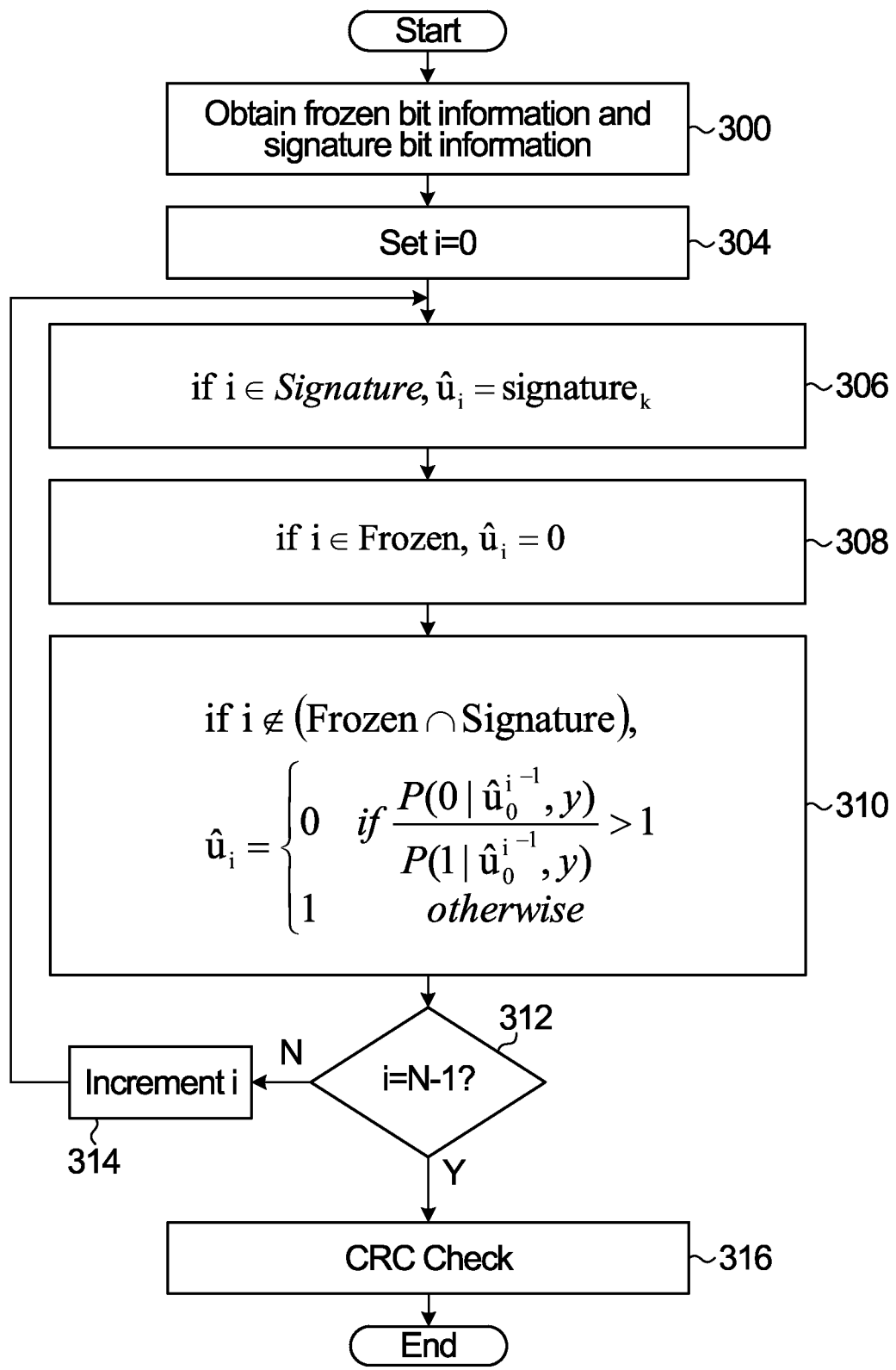
FIG. 6 is a flowchart of a method of decoding a codeword of a CRC-checked signature-enabled polar code.

FIG. 6 shows a flowchart of a method for implementation in a decoder of successive-cancellation decoding for a CRC-checked signature-enabled Polar codeword having N bits in bit positions i=0 to N−1. The method starts in block 300 with obtaining frozen bit information and signature bit information. This information indicates the M frozen bit positions (a set Frozen), and the K signature bit positions (a set Signature), and the values of the frozen bits (the frozen bits are typically not receiver specific, $Frozen_m$, m=0 to M−1, typically zero for all receivers), and the signature bits ($signature_k$, k=0, K−1, receiver specific). This information is obtained separately from the received codeword. For example, this information might be communicated by a transmitter to a receiver during an initial connection setup. In a specific example, N=16, M=3 and K=3, and the frozen bits are in positions 4,9 and 12 and have values 0,0,0, and the signature bits are in positions 0, 1,2 and have values 1,0,0, as indicated at 302. Decoding starts at bit position 0, by setting index i=0 in block 304. In block 306, if the index i is the index of a signature bit position, then $û_i$ is set to the corresponding known signature bit value. In block 308, if the index i is the index of a frozen bit position, then $û_i$ is set to the corresponding known frozen bit value. In block 310, if the index I is not the index of a signature bit position or a frozen bit position, then the bit position is decoded to a value of 0 or 1, for example using a path comparison operation. If the index i is equal to N−1 in block 312, then the method ends. Otherwise, the index i is incremented in block 314 and the method continues back at block 306.

The CRC bits are treated like data bits in the decoder in blocks 300 to 314. Then, when the bits are all decoded including data bits and CRC bits, the CRC check is performed in block 316. If the CRC check is successful then the decoded data bits are correct with high probability.

It can be seen that the path comparison block 310 is performed only for bits that are neither frozen bits nor signature bits. The approach of FIG. 6 is not dependent on the specific signature and frozen bit positions.

Another embodiment of the invention provides a CRC-checked multiple-signature-enabled Polar encoder. With such an encoder, multiple signatures are inserted, and differing receivers can decode differing subsets of data depending on their knowledge of the signatures.

Figure 7A:
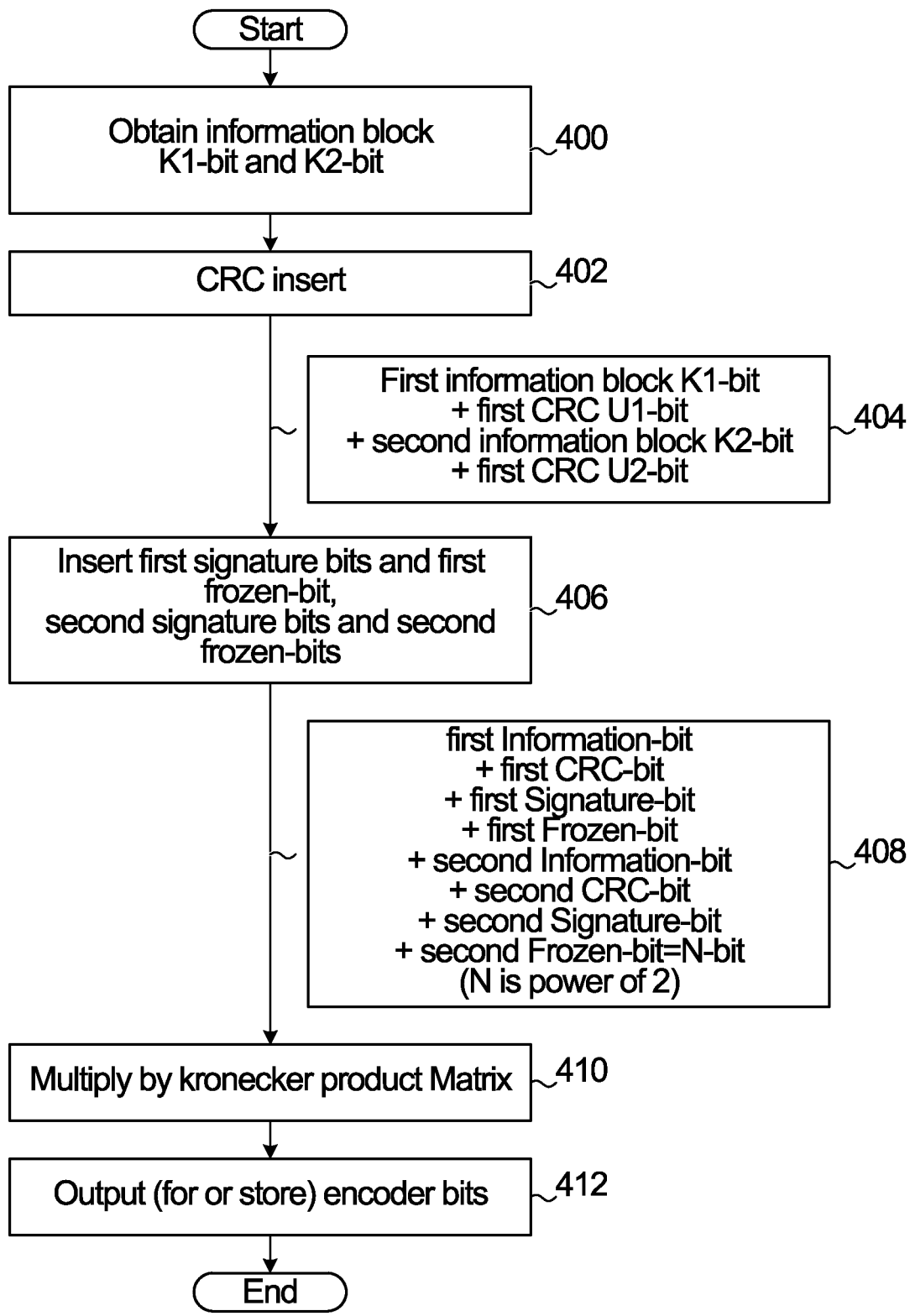
FIG. 7A is a flowchart of a method of CRC-checked signature-enabled polar code encoding with multiple signatures according to an embodiment of the invention.

Referring to FIG. 7A, starting at block 400, a K1-bit first information block and a K2-bit second information block are obtained. At 402 a u1-bit first CRC is calculated based on the K1-bit first information block, and a u2-bit second CRC is calculated based on the K2-bit second information block to produce a vector 404 with the K1-bit first information block, and the u1-bit first CRC, the k2-bit second information block, and the u2-bit second CRC. At 406, a M1-bit first signature is inserted before the K1-bit first information block, and an M2-bit second signature is inserted after the K1-bit first information block and the u1-bit first CRC and before the K2-bit second information block. In addition, the N−K1−u1−M1−K2−u2−M2 frozen bits are inserted to produce the N-bit input vector 408 where N is a power of 2. The vector 408 is then multiplied by the Kronecker product matrix at block 410 to produce an N-bit codeword which is output (or stored) at block 412.

A receiver with knowledge of only the M1-bit first signature can only decode the bits of the K1-bit first information block. It cannot decode the bits of the K2-bit second information block. A receiver with knowledge of both the M1-bit first signature and the M2-bit second signature can decode all the information bits. The decoding approach is the same as the approach 402 of FIG. 8, but a receiver that does not have all the signature bits would stop decoding for bit positions following a position containing an unknown signature bit.

Figure 7B:
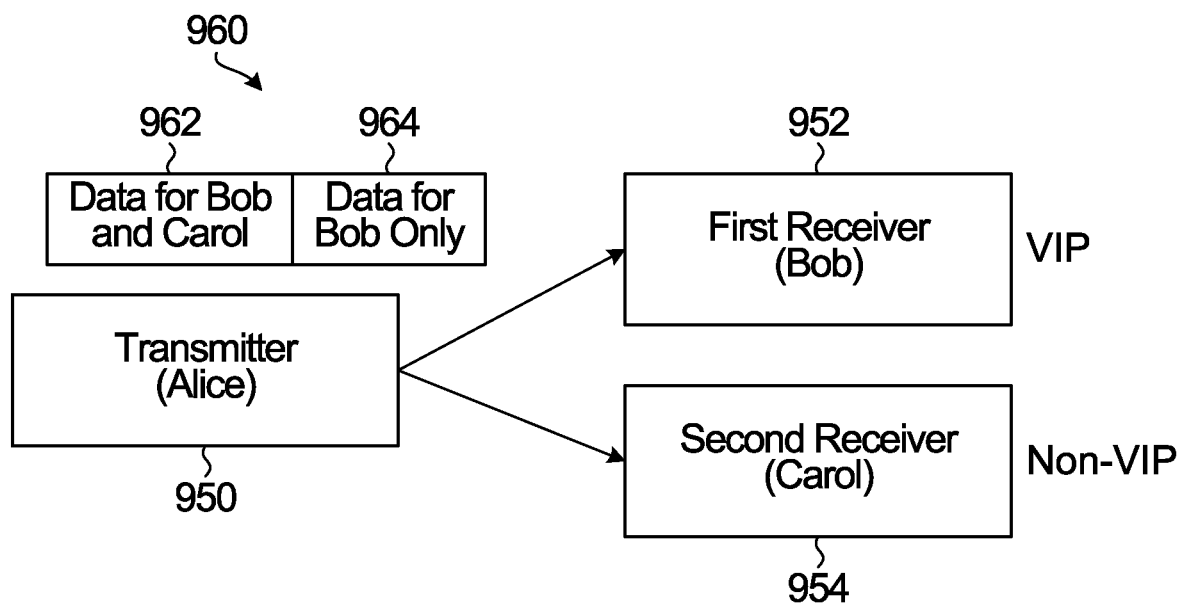
FIG. 7B is a block diagram of an example application scenario for the method of FIG. 7.

FIG. 7B shows an example scenario where the embodiment of FIG. 9A could be used, where a transmitter 950 (Alice's UE) has data 960 targeted for reception by a first receiver 952 (Bob's UE) and wants only some of the data 962 to be decoded by a second receiver 954 (Carol's UE) such that the rest of the data 964 can only be decoded by the first receiver 952. By informing a targeted receiver (Bob's UE in the example of FIG. 9B) of the all the signature bits, the targeted receiver can decode all of the data 960. By only informing a receiver (Carol's UE in the example of FIG. 9B) of only the first signature, the receiver can only decode the first part 962 of the data 960.

The multiple signature approach can be readily extended to accommodate P>=2 information blocks, by generating an input vector with P portions, each containing respective signature bits, one of the information blocks with at least one frozen bit inserted, and a CRC over the information block.

Figure 8:
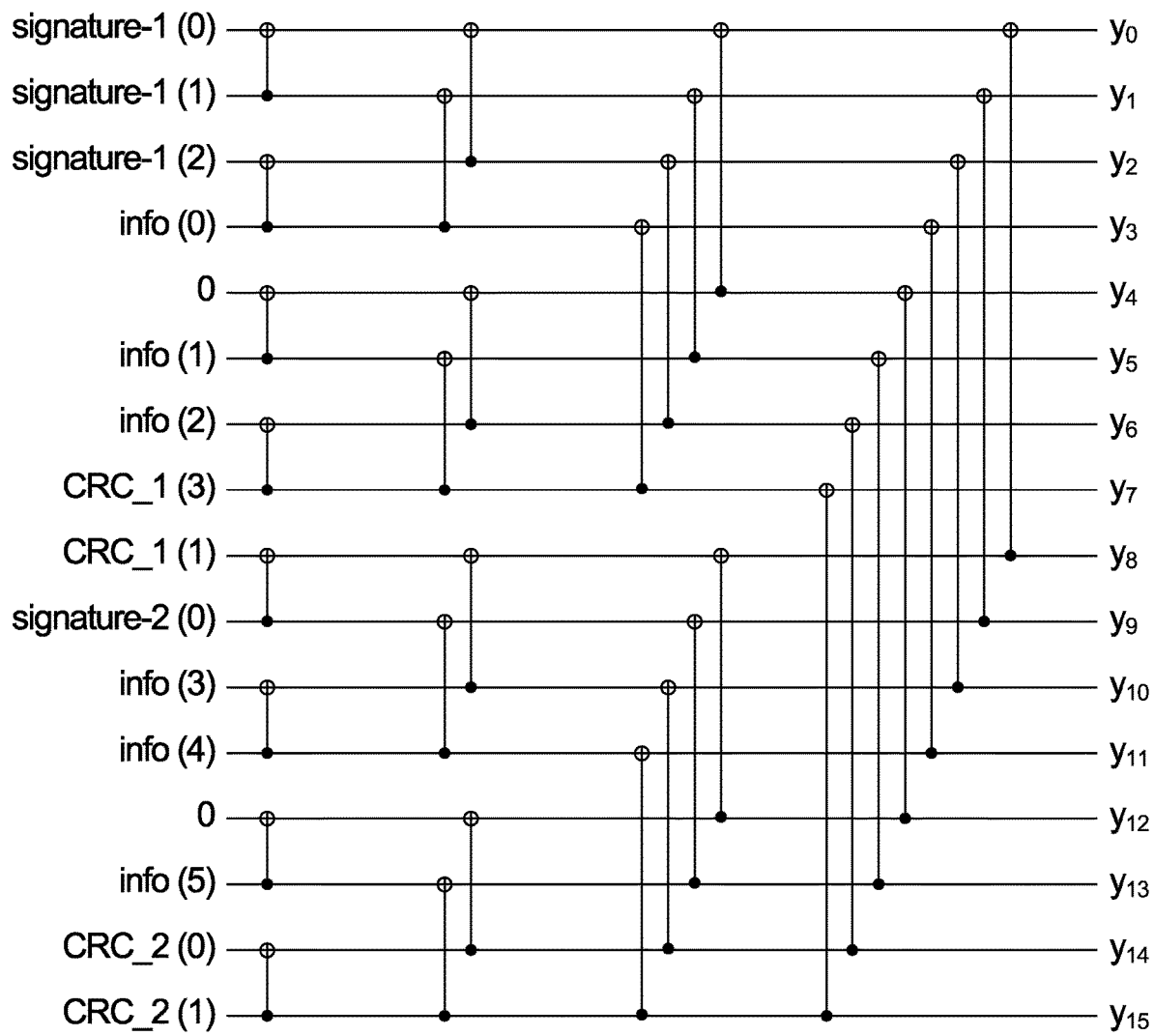
FIG. 8 is an example circuit implementation of the method of FIG. 7A.

A specific example of an encoder that uses signatures is depicted in FIG. 8, where N=16, K1=3, u1=2, M1=3, and K2=3, u2=2 and M2=1. For the first information block, bits 0,1,2 contain the M1-bit first signature. Bits 3,5,6 contain the K1 information bits. Bits 7 and 8 contain the u1 CRC bits, and bit 4 is a frozen bit. For the second information block, bit 9 contains the M2-bit second signature. Bits 10,11,13 contain the K2 information bits. Bits 14 and 15 contain the u2 CRC bits, and bit 12 is a frozen bit.

Advantages of the CRC-checked signature-enabled Polar code that may be realized in some implementations include:
 does not involve a high layer encryption and scheduling protocol to achieve signature-enabled communication;
 no extra computational resource is added to support the signature detection;
 no extra latency is added to detect the signature;
 no Polar BER/BLER performance loss due to the presence of the signature;
 the presence of the signature and size of the signature is hard to detect;
 a large signature size can be accommodated;
 multiple signatures are supported with each signature being associated with a portion of the information.

A CRC-checked signature-enabled polar code can be completely specified by the eight-tuple (N, K, F, vF, S, vS, C, vC), where:
 N is the code length in bits (or blocklength),
 K is the number of information bits encoded per codeword (or code dimension);
 vF is the binary vector of length Nf (frozen bits) and F is a subset of N−K indices from $\{0, 1, \ldots, N-1\}$ (frozen bit positions).
 vS is the binary vector of length Ns (signature bits) and S is a subset of N−K indices from $\{0, 1, \ldots, N-1\}$ (signature bit positions).
 vC is the binary vector of length Nc (CRC bits) and C is a subset of N−K indices from $\{0, 1, \ldots, N-1\}$ (CRC bit positions)
 where Nf+Ns+Nc=N−K
 and note I=$\{0, 1, \ldots, N-1\}\setminus(F,S,C)$ corresponds to the information bit indices.

In the above, the K+C bit positions correspond to reliable bit positions for the polar code, and the Nf+Nc bit positions correspond to unreliable bit positions for the polar code. An implementation without CRC is achieved by using all of the reliable bit positions as information bits. An implementation without frozen bits is achieved by using all of the unreliable bit positions as signature bits, although it should be noted that the signature bits function the same as frozen bits; the difference is that not all receivers are aware of the signature bits.

Given any subset of indices A from a vector x, the corresponding sub-vector is denoted as $x_A$.

For a (N, K, F, vF, S, vS, C, vC) polar code, the encoding operation for a vector of information bits u of length K will now be described. Let m=log 2 (N) and $G = F^{\otimes^n} = F \otimes \ldots \otimes F$ be the m-fold Kronecker product of a seed matrix F, Where F is $$\begin{pmatrix} 1 & 1 \\ 0 & 1 \end{pmatrix}.$$

Then, a codeword is generated as
x=G d where d is a column vector $\in \{0, 1\}^N$ such that $d_F$=vF and $d_I$=u, $d_C$=vC and $d_S$=vS.
 or x=d $G^T$ where $(\ )^T$ indicates matrix transpose, and d is a row vector $\in \{0, 1\}^N$ such that $d_F$=vF and $d_I$=u, $d_C$=vC and $d_S$=vS.
Equivalently, if the seed matrix is as in the examples described above,
 x=d G and d is a row vector $\in \{0, 1\}^N$ such that $d_F$=vF and $d_I$=u, $d_C$=vC and $d_S$=vS.

In polar codes that are not signature enabled, the choice of the set F of frozen bit positions (i.e. the unreliable bit positions) is a step in polar coding often referred to as polar code construction. See, for example, Arikan's paper, referred to previously. More generally, any method of choosing a set of polar code noisy bit positions can be used instead to choose a set of positions that will be used for signature bits, or signature bits and frozen bits. As noted previously, in some cases, all frozen bit positions are used for signature bits. This application is not limited to specific frozen bit position/signature bit positions. However, within the set of positions thus chosen, a give signature bit needs to be included before information bits associated with the given signature bit. In addition, CRC bits, when included, are placed in polar code reliable bit positions. The Kronecker product matrix based on the specific seed matrix referred to above is a specific example of a Polar code generator matrix. More generally, any Polar code generator matrix can be employed that produces codewords with reliable and unreliable positions. In some embodiments, a Polar code generator matrix is based on a Kronecker product matrix of a different seed matrix. For example, the seed matrix may be a prime-number dimensions matrix, such as 3×3 or 5×5. The seed matrix may be binary or non-binary.

More generally, any method of encoding that is mathematically equivalent with the described methods can be employed. For example, once a set of codewords is determined as described herein, many different encoder structures known in the art can be used to encode input data to produce codewords. Typically the encoder described herein is included as part of an apparatus that includes other components. These might, for example, include a modulator that modulates bits output by the encoder to produce symbols, and a transmitter that transmits the symbols over a channel such as a wireless channel. Similar reverse functionality would be in the receiver together with the decoder.

Figure 9:
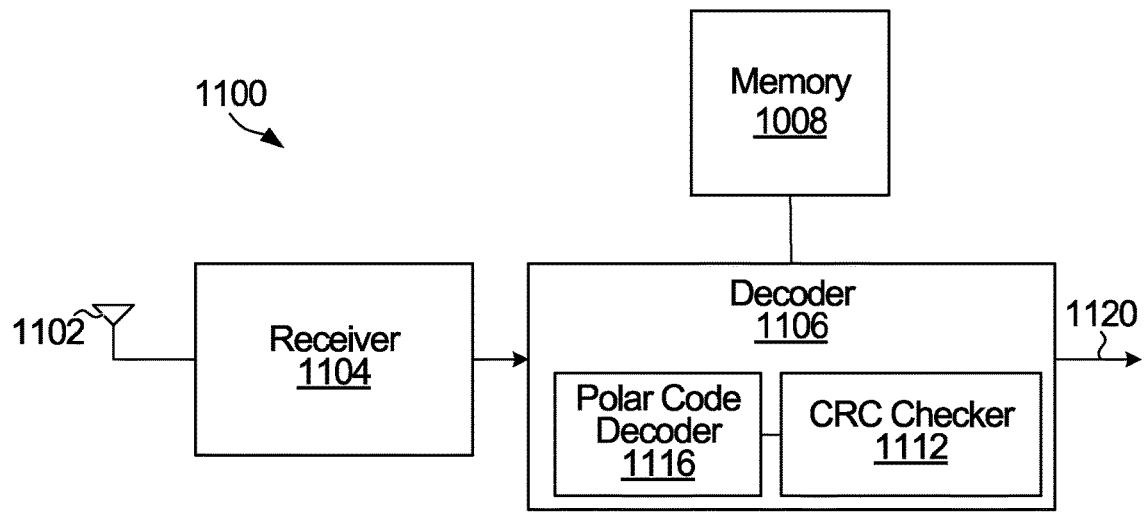
FIG. 9 is a block diagram of an apparatus for receiving and decoding codewords of a CRC-checked signature-enabled polar code.

FIG. 9 is a block diagram of an apparatus for receiving and decoding codewords. The apparatus 1100 includes a receiver 1104 coupled to an antenna 1102 for receiving signals from a wireless channel, and a decoder 1106. Memory 1108 is coupled to the decoder 1106. In some embodiments, the receiver 1104 includes a demodulator, an amplifier, and/or other components of an RF receive chain. The receiver 1104 receives, via the antenna 1102, a word that is based on a codeword of a polar code. Decoded bits are output at 1120 for further receive processing.

The decoder 1106 is implemented in circuitry, such as a processor, that is configured to estimate bits in the received word as disclosed herein. The memory 1108 could include one or more solid-state memory devices and/or memory devices with movable and possibly removable storage media. In a processor-based implementation of the decoder 1106, processor-executable instructions to configure a processor to perform decoding operations are stored in a non-transitory processor-readable medium. The non-transitory medium could include the same memory device(s) used for the memory 1108, or one or more separate memory devices. The decoding method of FIG. 6 represents one possible implementation of the decoder 1106 and the memory 1108.

The memory 1008 could be used to store results of processing by the processing elements of the decoder 1106. The decoder 1106 could also include an address multiplexer coupled between the processing elements and the memory 1008. In an embodiment, the decoder 1106 is configured to store the results of the processing by the processing elements to respective memory areas in the memory 1008 that are each accessible to provide, in a single memory access operation, inputs to each of the processing elements for subsequent computations. Other embodiments may include further, fewer, or different components and/or variations in operation of receiving apparatus components.

In a specific example, the decoder 1106 includes a polar code decoder 1116 configured to perform to polar code decoding of the received codeword by treating at least one signature bit as a frozen bit having a known signature bit value. The apparatus may be configured to receive information on signature bits used in the signature-enabled polar code separately from receiving the codeword. Where CRC is employed, the decoder 1106 includes a CRC checker 1112 configured to verify a result of decoding using a CRC check.

Figure 10:
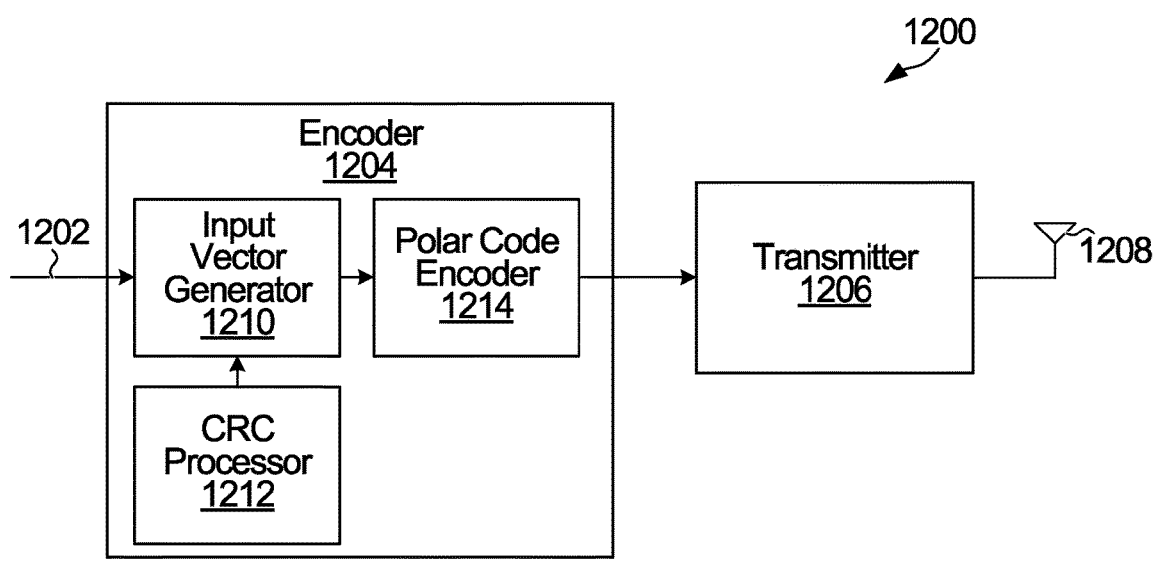
FIG. 10 is a block diagram of an apparatus for encoding and transmitting codewords of a CRC-checked signature-enabled polar code.

FIG. 10 is a block diagram of an example apparatus for encoding and transmitting codewords. The apparatus 1200 includes an encoder 1204 coupled to a transmitter 1206. The encoder 1204 is implemented in circuitry that is configured to encode an input bit stream 1202 using a signature-enabled polar code, or a CRC-checked signature-enabled polar code. In the illustrated embodiment, the apparatus 1200 also includes an antenna 1208, coupled to the transmitter 1206, for transmitting signals over a wireless channel. In some embodiments, the transmitter 1206 includes a modulator, an amplifier, and/or other components of an RF transmit chain.

In some embodiments, the apparatus 1200, and similarly the apparatus 1100 in FIG. 11, include a non-transitory computer readable medium that includes instructions for execution by a processor to implement and/or control operation of the encoder 1204 in FIG. 12, to implement and/or control operation of the decoder 1106 in FIG. 11, and/or to otherwise control the execution of methods described herein. In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which could be, for example, a compact disc read-only memory (CD-ROM), universal serial bus (USB) flash disk, or a removable hard disk.

Communication equipment could include the apparatus 1100, the apparatus 1200, or both a transmitter and a receiver and both an encoder and a decoder. Such communication equipment could be user equipment or communication network equipment. In a specific example, the encoder 1204 includes an input vector generator 1210 configured to produce an N-bit input vector for polar encoding, the input vector having polar code reliable bit positions and polar code unreliable bit positions by inserting each of at least one information bit in a respective polar code reliable bit position, and each of at least one signature bit in a respective polar code unreliable bit position, where $N=2^m$ where m>=2. The encoder 1202 also includes a polar code encoder 1214 configured to multiply the input vector by a polar code generator matrix to produce a signature-enabled polar codeword. The transmitter 1206 transmits the signature-enabled polar codeword. In addition, or alternatively, there may be a memory (not shown) for storing the signature-enabled polar codeword.

In embodiments that include the CRC, the apparatus also includes a CRC processor 1214 configured to process the K information bits to produce a u-bit CRC, where u>=1. In this case, the input vector generator 1210 produces the N-bit input vector by inserting each of the u CRC bits in a respective polar code reliable bit position.

In some embodiments, the input vector producer uses the multiple signature approach described previously, with or without CRC.

A signature-enabled Polar code encoder and decoder are provided. Signature bits are inserted in some unreliable bit positions. Different signature bits are inserted for different receivers. For a given codeword, only the receiver with knowledge of the signature can decode the codeword. Cyclic redundancy check (CRC) bits may be included in the input vector to assist in decoding.

A broad aspect of the disclosure provides a method in an encoder. The method involves producing an N-bit input vector for polar encoding, the input vector having polar code reliable bit positions and polar code unreliable bit positions, by inserting each of at least one information bit in a respective polar code reliable bit position, and each of at least one signature bit in a respective polar code unreliable bit position, where $N=2^m$ where $m>=2$. The N-bit input vector is multiplied by a polar code generator matrix to produce a polar code codeword, and then the polar code codeword is transmitted or stored.

Optionally, the at least one information bit includes K information bits, $K>=1$, and the method further involves processing the K information bits to produce a u-bit CRC, where $u>=1$, and producing the N-bit input vector by inserting each of the u CRC bits in a respective polar code reliable bit position. As a result, the polar codeword is a CRC-checked polar codeword.

Optionally, the method further involves communicating the at least one signature bit to a receiver separately from the transmission of the codeword.

Another broad aspect of the disclosure provides a method in an encoder that involves: producing an input vector by: for each of P information blocks, where $P>=2$, producing a respective portion of an input vector, the respective portion starting with a respective set of at least one signature bit and also containing the information block, each of the sets of signature bits being different from each other; combining the respective portions to produce the input vector; multiplying the input vector by a polar code generator matrix to produce a polar code codeword; and then transmitting or storing the codeword.

Optionally, producing the input vector further involves processing each information block to produce a respective set of CRC bits, and for each of the P information blocks, including the respective set of CRC bits in the respective portion of the input vector.

Another broad aspect of the disclosure provides a method in a decoder. The method involves receiving a codeword that was encoded with a polar code in which at least one frozen bit is replaced with a corresponding at least one signature bit specific to the decoder and known to the decoder separately from receiving the codeword. Decoding of the received codeword is performed by setting the at least one frozen bit to equal the corresponding at least one signature bit value.

Optionally, the method further includes receiving information on signature bits used in the polar code separately from receiving the codeword.

Optionally, the codeword was encoded with a CRC-checked signature enabled polar code, in which case the method further involves verifying a result of decoding using a CRC check.

Another broad aspect of the disclosure provides an apparatus that has an input vector generator configured to produce an N-bit input vector for polar encoding, the input vector having polar code reliable bit positions and polar code unreliable bit positions, by inserting each of at least one information bit in a respective polar code reliable bit position, and each of at least one signature bit in a respective polar code unreliable bit position, where $N=2^m$ where $m>=2$. In addition, the apparatus has a polar code encoder configured to multiply the input vector by a polar code generator matrix to produce a polar codeword.

Another broad aspect of the disclosure provides an apparatus having an input vector generator configured to produce an N-bit input vector for polar encoding by: for each of P information blocks, where $P>=2$, producing a respective portion of the input vector, the respective portion starting with a respective set of at least one signature bit and also containing the information block, each of the sets of signature bits being different from each other; and combining the respective portions to produce the input vector.

The apparatus also has a polar code encoder configured to multiply the input vector by a polar code generator matrix to produce a polar codeword.

Optionally, the apparatus has a CRC processor configured to process each information block to produce a respective set of CRC bits. In this case, the input vector producer includes the respective set of CRC bits for each of the P information blocks in the respective portion of the input vector.

Another broad aspect of the disclosure provides an apparatus having a a receiver for receiving a codeword that was encoded with a polar code, and a decoder configured to polar code decoding of the received codeword by treating at least one signature bit as a frozen bit having a known signature bit value.

Optionally, the apparatus is configured to receive information on signature bits used in the polar code separately from receiving the codeword.

Optionally, the apparatus also has a CRC checker configured to verify a result of decoding using a CRC check.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

The invention claimed is:

1. An apparatus comprising:
at least one processor configured to polar encode an input vector to produce a codeword, the input vector including information bits and one or more signature bits, at least one bit of the one or more signature bits being in a respective bit position of the input vector that has a lower reliability than a reliability of each bit position of the input vector for the information bits; and
an output for outputting the codeword for transmission over a wireless communications channel to a receiver.

2. The apparatus of claim 1 further configured to: transmit information about the one or more signature bits to at least one receiver device separately from sending the codeword.

3. The apparatus of claim 1 wherein the one or more signature bits is specific to at least one receiver device.

4. The apparatus of claim 1 wherein at least one signature bit of the one or more signature bits is in a respective bit position of the input vector that is before each bit position of the input vector for the information bits.

5. The apparatus of claim 1 wherein the input vector further comprises cyclic redundancy check (CRC) bits generated based on the information bits, wherein the CRC bits are in bit positions with higher reliabilities than reliabilities of bit positions for the one or more signature bits.

6. The apparatus of claim 1 wherein the input vector further comprises cyclic redundancy check (CRC) bits generated based on the information bits, and at least one signature bit of the one or more signature bits is in a respective bit position of the input vector that is before each bit position of the input vector for the information bits and the CRC bits.

7. The apparatus of claim 1 wherein the input vector further comprises cyclic redundancy check (CRC) bits generated based on the information bits, at least one signature bit of the one or more signature bits is in a respective bit position of the input vector that is after a bit position for at least one of the CRC bits.

8. An apparatus comprising:
at least one processor configured to
receive a codeword received over a wireless communications channel from a transmitter and produced based on a polar encoding an input vector including information bits and one or more signature bits, at least one bit of the one or more signature bits being in a respective bit position that has a lower reliability than a reliability of each bit position of the input vector for the information bits; and
decode the received codeword to produce decoded bits.

9. The apparatus of claim 8 further configured to receive, from a transmitter device, information about the one or more signature bits separately from receiving the codeword.

10. The apparatus of claim 8 wherein the one or more signature bits is specific to a group of receiver devices that includes the apparatus.

11. The apparatus of claim 8 wherein at least one signature bit of the one or more signature bits is in a respective bit position of the input vector that is before each bit position of the input vector for the information bits.

12. The apparatus of claim 8 wherein the input vector further comprises cyclic redundancy check (CRC) bits generated based on the information bits, wherein the CRC bits are in bit positions with higher reliabilities than reliabilities of bit positions for the one or more signature bits.

13. The apparatus of claim 8 wherein the input vector further comprises cyclic redundancy check (CRC) bits generated based on the information bits, and at least one signature bit of the one or more signature bits is in a respective bit position of the input vector that is before each bit position of the input vector for the information bits and the CRC bits.

14. The apparatus of claim 8 wherein the input vector further comprises cyclic redundancy check (CRC) bits generated based on the information bits, and at least one signature bit of the one or more signature bits is in a respective bit position of the input vector that is after a bit position for at least one of the CRC bits.

15. A method for an apparatus comprising at least one processor and a non-transitory computer-readable medium having stored thereon computer-executable instructions for execution by the at least one processor, the method comprising:
polar encoding an input vector to produce a codeword, the input vector including information bits and one or more signature bits, at least one bit of the one or more signature bits being in a respective bit position of the input vector that has a lower reliability than a reliability of each bit position of the input vector for the information bits; and
outputting the codeword for transmission over a wireless communications channel to a receiver.

16. The method of claim 15 further comprising:
transmitting information about the one or more signature bits to at least one receiver device separately from sending the codeword.

17. The method of claim 15 wherein the one or more signature bits is specific to at least one receiver device.

18. The method of claim 15 wherein at least one signature bit of the one or more signature bits is in a respective bit position of the input vector that is before each bit position of the input vector for the information bits.

19. The method of claim 15 wherein the input vector further comprises cyclic redundancy check (CRC) bits generated based on the information bits, wherein the CRC bits are in bit positions with higher reliabilities than reliabilities of bit positions for the one or more signature bits.

20. The method of claim 15 wherein the input vector further comprises cyclic redundancy check (CRC) bits generated based on the information bits, and at least one signature bit of the one or more signature bits is in a respective bit position of the input vector that is before each bit position of the input vector for the information bits and the CRC bits.

21. The method of claim 15 wherein the input vector further comprises cyclic redundancy check (CRC) bits generated based on the information bits, and at least one signature bit of the one or more signature bits is in a respective bit position of the input vector that is after a bit position for at least one of the CRC bits.

22. A method, for an apparatus comprising at least one processor and a non-transitory computer-readable medium having stored thereon computer-executable instructions for execution by the at least one processor, the method comprising:
receiving, by the apparatus, a codeword received over a wireless communications channel from a transmitter and produced based on a polar encoding an input vector including information bits and one or more signature bits, at least one bit of the one or more signature bits being in a respective bit position that has a lower reliability than a reliability of each bit position of the input vector for the information bits; and
polar decoding the received codeword to produce decoded bits.

23. The method of claim 22 further comprising receiving, from a transmitter device, information about the one or more signature bits separately from receiving the codeword.

24. The method of claim 22 wherein the one or more signature bits is specific to a group of receiver devices that includes the apparatus.

25. The method of claim 22 wherein at least one signature bit of the one or more signature bits is in a respective bit position of the input vector that is before each bit position of the input vector for the information bits.

26. The method of claim 22 wherein the input vector further comprises cyclic redundancy check (CRC) bits generated based on the information bits, wherein the CRC bits are in bit positions with higher reliabilities than reliabilities of bit positions for the one or more signature bits.

27. The method of claim 22 wherein the input vector further comprises cyclic redundancy check (CRC) bits generated based on the information bits, and at least one signature bit of the one or more signature bits is in a respective bit position of the input vector that is before each bit position of the input vector for the information bits and the CRC bits.

28. The method of claim 22 wherein the input vector further comprises cyclic redundancy check (CRC) bits generated based on the information bits, and at least one signature bit of the one or more signature bits is in a respective bit position of the input vector that is after a bit position for at least one of the CRC bits.

\* \* \* \* \*